Feb. 12, 1952          H. A. MALE          2,585,809

LOADING MECHANISM FOR GEAR PRODUCING MACHINES

Filed Jan. 21, 1950          11 Sheets-Sheet 1

INVENTOR.
HERMAN A. MALE
BY
Attorney

INVENTOR.
HERMAN A. MALE

INVENTOR.
HERMAN A. MALE

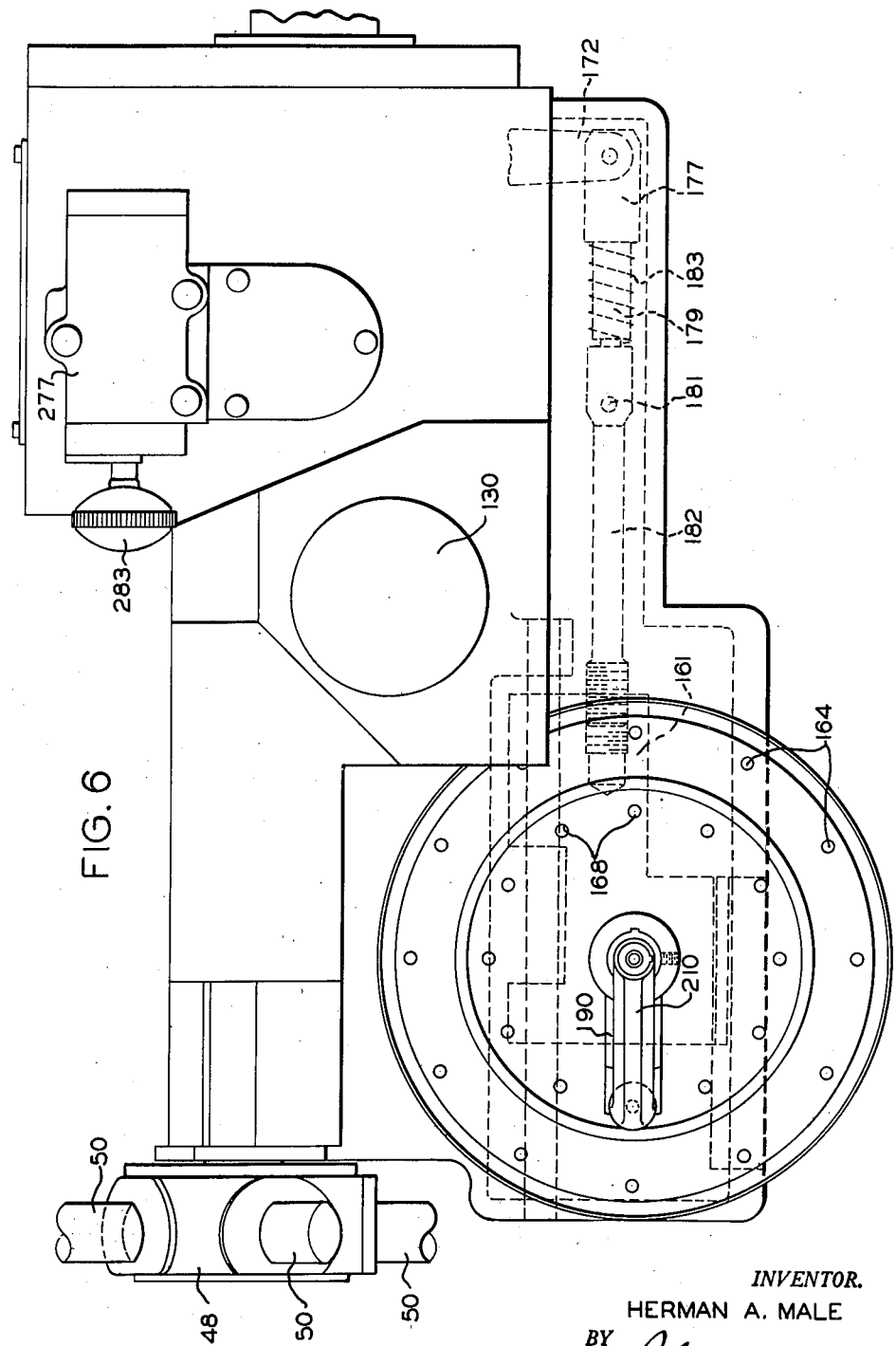

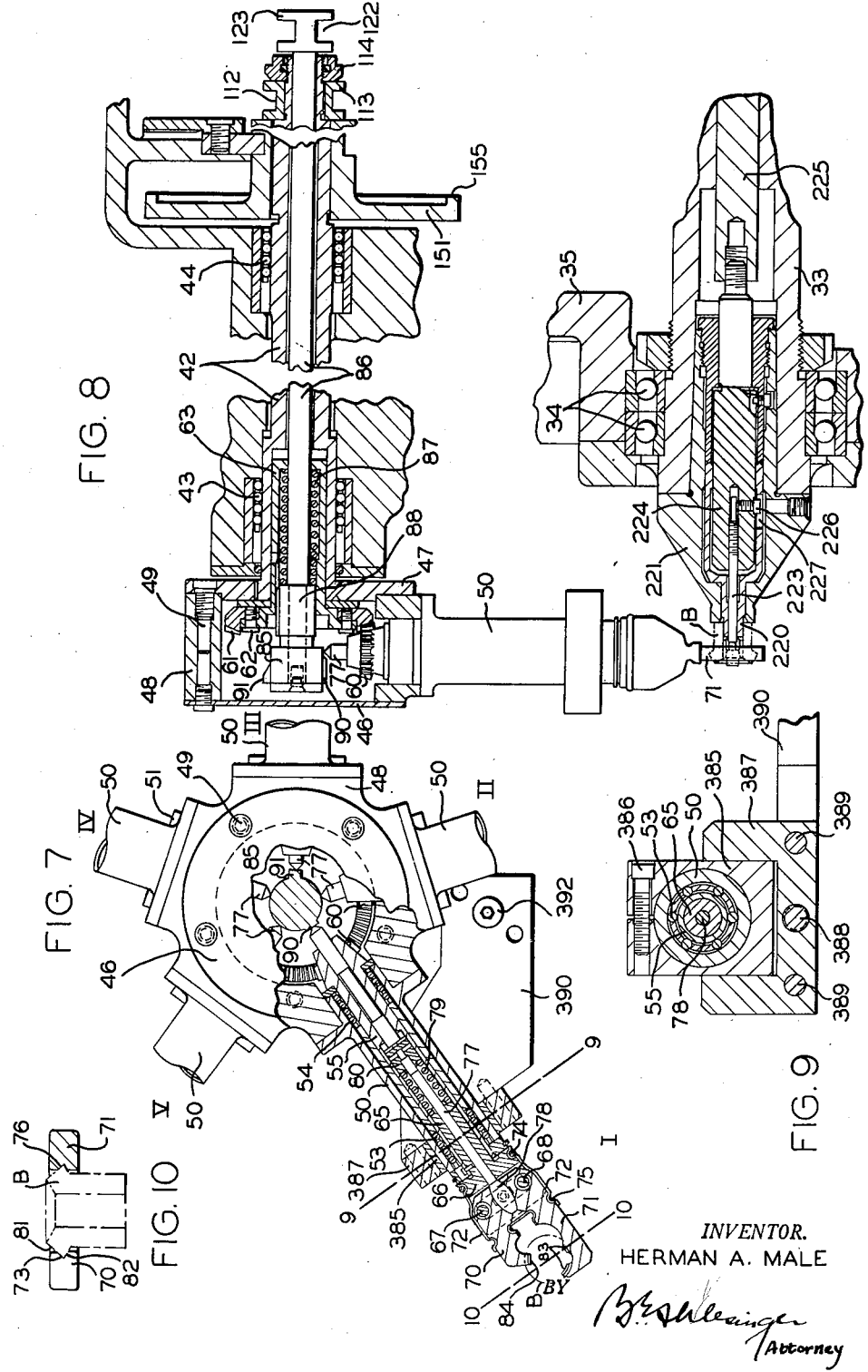

Feb. 12, 1952     H. A. MALE     2,585,809
LOADING MECHANISM FOR GEAR PRODUCING MACHINES
Filed Jan. 21, 1950     11 Sheets—Sheet 8
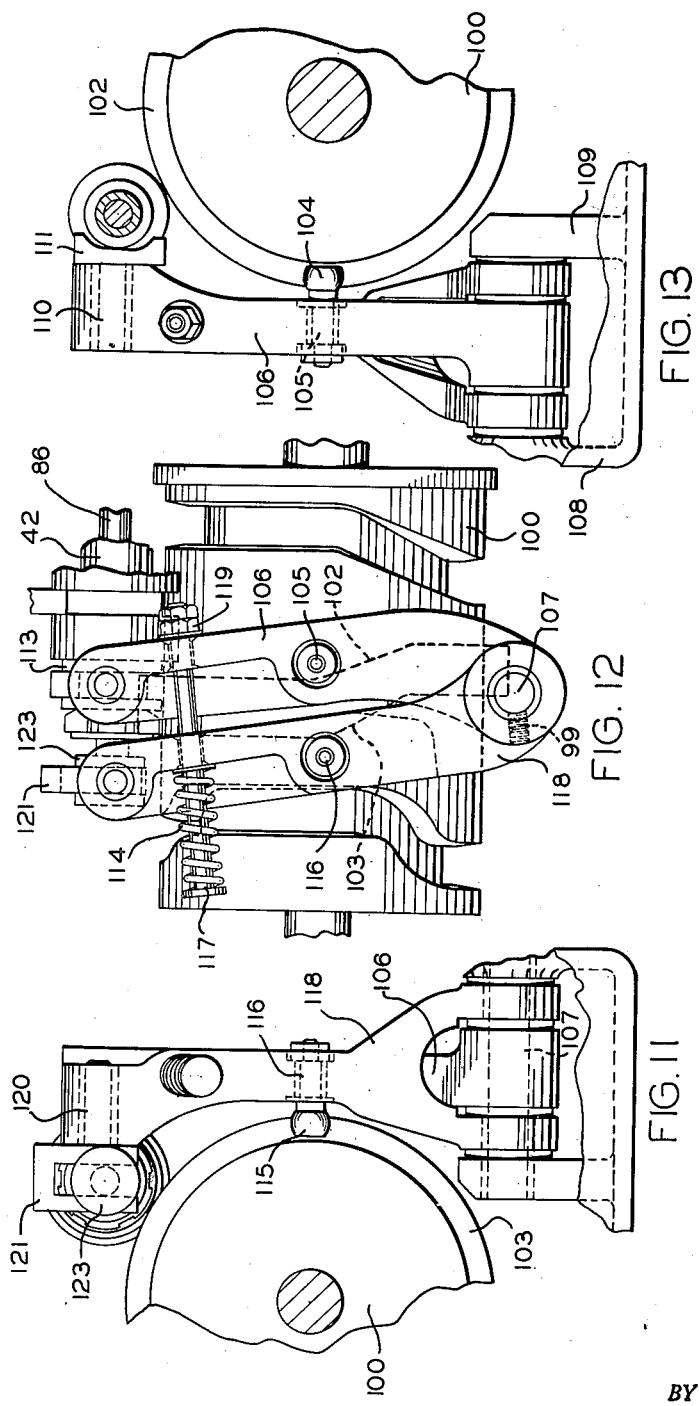
INVENTOR.
HERMAN A. MALE
BY
Attorney Feb. 12, 1952 H. A. MALE 2,585,809
LOADING MECHANISM FOR GEAR PRODUCING MACHINES
Filed Jan. 21, 1950 11 Sheets-Sheet 9

INVENTOR.
HERMAN A. MALE
BY
Attorney

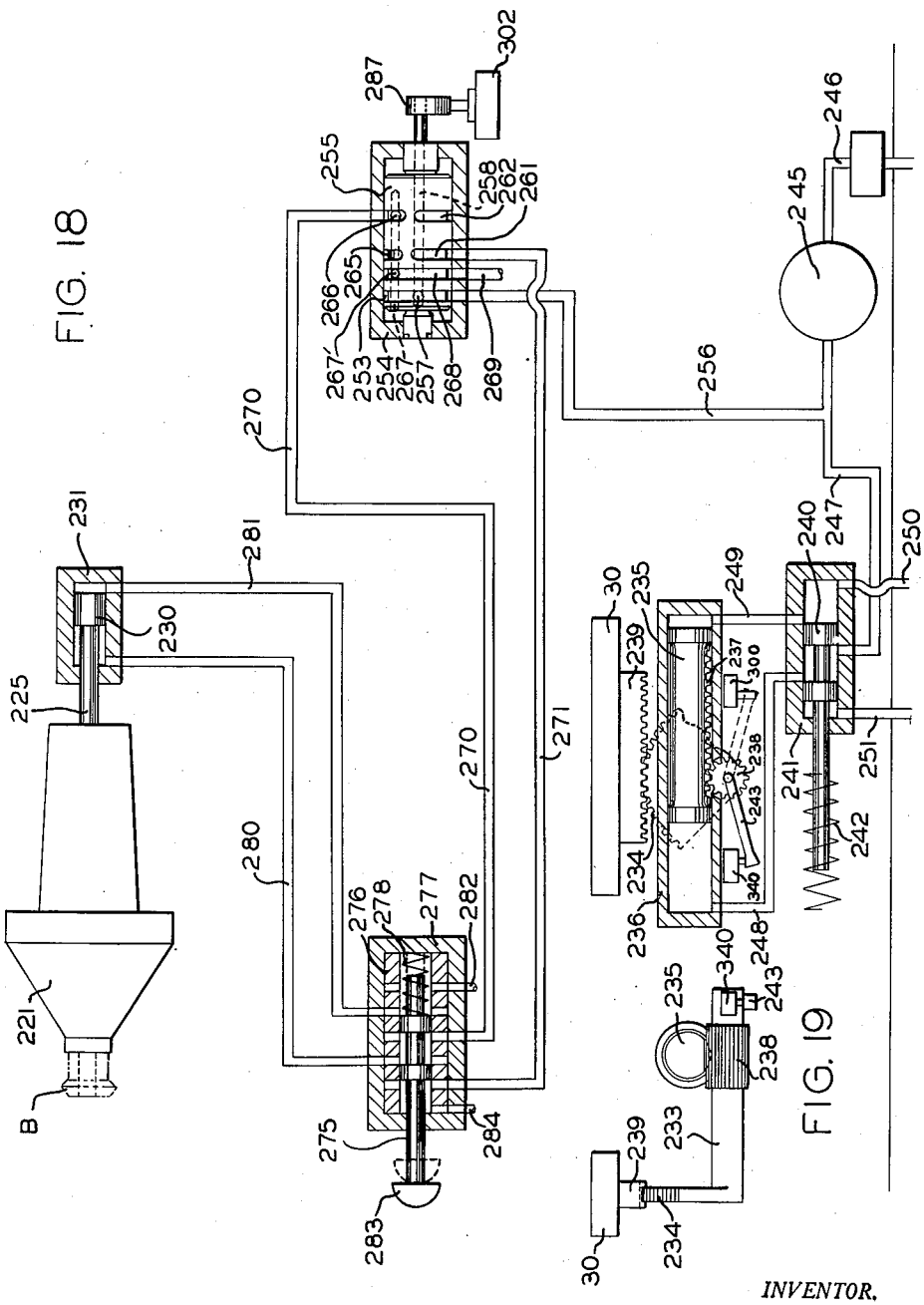

Feb. 12, 1952 H. A. MALE 2,585,809
LOADING MECHANISM FOR GEAR PRODUCING MACHINES
Filed Jan. 21, 1950 11 Sheets-Sheet 11

INVENTOR.
HERMAN A. MALE
BY *Bfshlesinger*
Attorney

Patented Feb. 12, 1952

2,585,809

UNITED STATES PATENT OFFICE 2,585,809

LOADING MECHANISM FOR GEAR PRODUCING MACHINES

Herman A. Male, Brighton, N. Y., assignor to Gleason Works, Rochester, N. Y., a corporation of New York Application January 21, 1950, Serial No. 139,909

20 Claims. (Cl. 90—1)

The present invention relates to machines for producing gears and more particularly to mechanism for automatically loading and chucking the work on such a machine and for automatically removing the completed gears from the machine after the desired operations have been performed on the work.

In previous designs of loading mechanisms for gear-producing machines it has been necessary to stop the machine, after the work on a gear has been completed, while the finished work piece is being removed from the work spindle and transferred to a chute or to a magazine for holding finished work pieces and while the new work piece is being taken from the stock magazine and placed upon the work spindle. Thus, despite the automatic unloading and loading, the machine will be idle for a considerable length of time in the course of a day. Moreover, the percentage of lost time will be greater, the faster the tooth-cutting, tooth-grinding or other operation being performed on the gear, for the unloading and loading time for a given loading mechanism is more or less constant.

A primary object of the present invention is to provide a loading mechanism for machines for producing gears which will be faster in operation than previous such mechanisms and which will reduce materially the time of stoppage of the machine.

A related object of the invention is to provide a loading mechanism for a machine for producing gears which so functions that the machine is stopped only while the completed work piece is actually being taken from the work spindle and a new work piece is being placed thereon, the transfer of the completed work piece to its magazine and partial transfer of a new work piece from the stock magazine to the work spindle being accomplished while a work piece is being operated upon.

Another object of the invention is to provide an improved type of loading mechanism which is interlocked in operation with the gear cutting or other machining operations of the machine on which the loading mechanism is used, so that on completion of the machining operations on a work piece, the completed work piece is automatically dechucked, stripped from the work spindle, and a new work piece is thereupon automatically loaded upon the work spindle and chucked, and then the machining operations are restarted.

Another object of the invention is to provide an improved type of loading mechanism in which the transfer operations of moving a finished work piece away from the work spindle and placing a new work piece thereon are accomplished in a minimum length of time.

A further object of the invention is to provide a loading mechanism in which the transfer members have gripping jaws which are so constructed and operated that during the whole of the machining operations on the work they are opened but in registry with the work so that, at the end of the machining operation, they need only to be closed to grip the work, and then the unloading of the work spindle can be effected.

Other objects of the invention will be apparent hereinafter from the specification and from the recital of the appended claims.

In the drawings:

Fig. 6 is a fragmentary plan view of the loading mechanism;

Fig. 7 is a fragmentary front elevation, with parts broken away of the transfer unit of the loading mechanism, the guide for precisely locating the transfer arm at the loading station being also shown partially in section;

Fig. 8 is a fragmentary axial sectional view through the transfer mechanism, showing in elevation one transfer arm at the loading station and showing also the work spindle fragmentarily in axial section;

Fig. 9 is a section on the line 9—9 of Fig. 7, showing the guide for locating each transfer arm at the loading station;

Fig. 10 is a section on the line 10—10 of Fig. 7, showing the structure of the gripping jaws;

Fig. 11 is a fragmentary view on an enlarged scale looking at the main control cam from the rear and showing two of the followers which engage therewith and the levers which carry these followers;

Fig. 12 is a view at right angles to Fig. 11 looking at one side of the cam;

Fig. 13 is a fragmentary view looking at the cam and levers from the front;

Fig. 14 is a fragmentary sectional view showing the rotary control valve of the mechanism and its mounting;

Fig. 15 is a section on the line 15—15 of Fig. 14;

Fig. 16 is a section on the line 16—16 of Fig. 14;

Fig. 18 is a diagrammatic view showing the hydraulic circuit for the fluid-pressure operated parts of the loading mechanism;

Fig. 19 is a detail view of the drive to the sliding base of the machine; and

Figure 1:
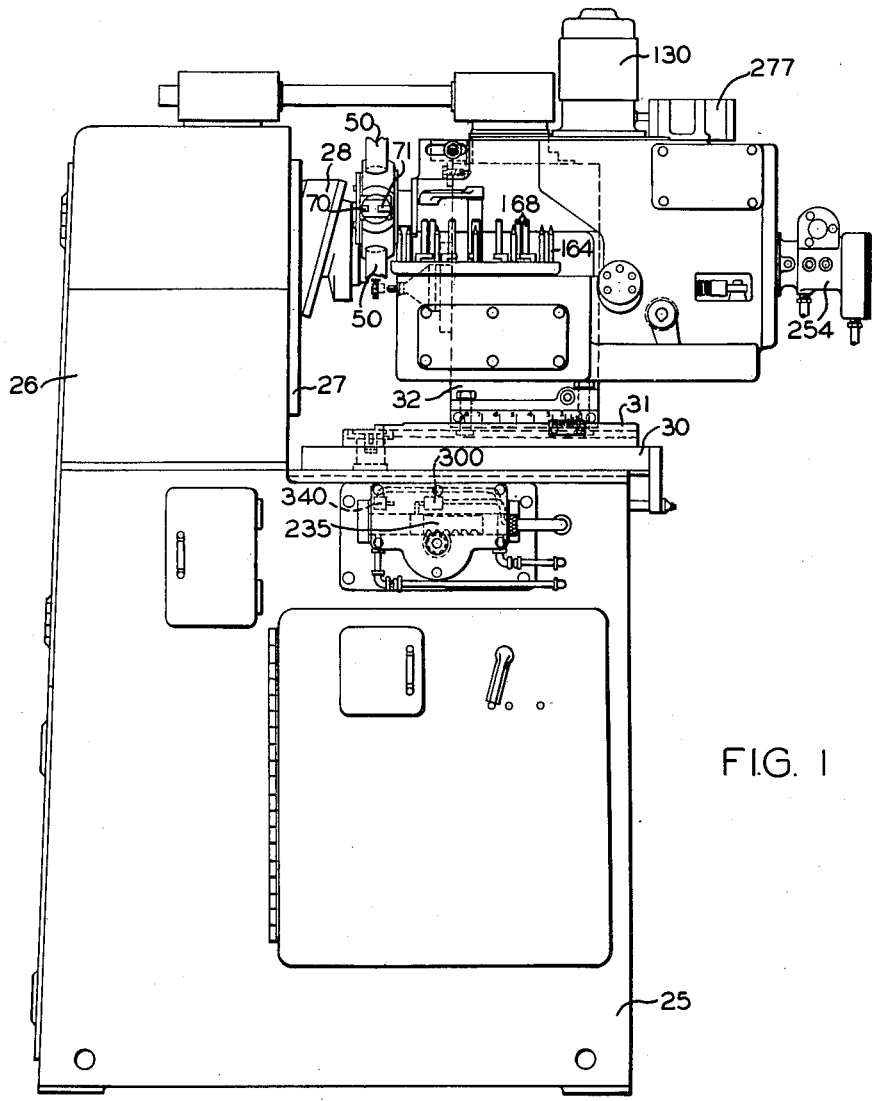
Fig. 1 is a side elevation of a bevel gear cutting machine equipped with a loading mechanism built according to one embodiment of the invention two of the arms of the loading mechanism being shown only fragmentarily.

The invention is illustrated as applied to a conventional type face-mill gear cutting machine. In such a machine a rotary face-mill cutter is employed that is rotated in engagement with the work while the cutter and work are rolled relative to one another to generate the tooth profiles of the work. After each generating operation, the work is withdrawn from engagement with the tool and indexed to bring another tooth space of the work into position to be cut. Then the work is fed back into operative relation with the tool; and the tool and work are again rolled together to effect a generating operation on another tooth of the work. When the work has been indexed through a complete revolution, that is, when cutting operations have been performed on all of the teeth of the work, the machine is automatically stopped. All this is conventional structure and forms no part of the present invention. It has therefore been illustrated only where necessary for illustration and description of the structure and operation of the mechanism of the present invention.

In a machine equipped with a loading mechanism built according to the preferred embodiment of the present invention, there are two concentrically disposed rows of spools or pins, one row holding the completed work pieces and the other holding the new blanks. The spools or pins are secured in a rotatable support which is indexable step-by-step about their common axis.

The blanks are picked off their spools by gripping jaws which are carried by a plurality of transfer arms; and the completed work pieces are removed from the work spindle of the machine by these same gripping jaws and transferred to their spools by these same transfer arms. The axis of the spool support is at right angles to the axis of the work spindle.

The transfer arms are rotatably mounted in a rotatably indexable head which is indexable about an axis parallel to the axis of the work spindle. The transfer arms extend radially of the axis of their head; and are geared to the head so that each time that the head is indexed the transfer arms are rotated through an angle about their respective axes. Through indexing rotation of the head and step-by-step rotation about its own axis, each transfer arm with its gripping jaws is moved step-by-step from a position in which the gripping jaws are in alignment with and can place a blank on the work spindle of the machine or remove a completed gear therefrom, to a position where they can drop a completed gear onto a magazine spool or pick up a new blank from a magazine spool.

The spool support is journaled in a slide which is reciprocable to shift the spools so that when a transfer arm arrives over the spool support with a completed gear there will be a spool in position to receive that gear when it is released by opening the gripping jaws of that transfer arm, and so that then a blank-carrying spool may be moved into alignment with the empty gripping jaws. A forked lifting member then lifts the stack of blanks, which is on the blank-carrying spool, high enough to bring the uppermost blank in the stack between the gripping jaws. The gripping jaws are then closed to grip this blank ready for transfer to the work spindle upon ensuing operations of the loading mechanism.

During cutting of a blank, the gripping jaws, which placed the blank on the work spindle, are open but straddling the blank so that upon completion of the cutting operations, they may be closed to grip the now-completed gear so as to carry it away from the work spindle and ultimately to one of the spools for receiving such gears.

When the automatic stop of the machine trips, the sliding base, which carries the work, is automatically withdrawn to loading position; the chucking mechanism is released; the jaws of that transfer arm, which is then at the work station, are closed to grip the completed gear; the completed gear is stripped from the work spindle; then the transfer mechanism is indexed one step to bring a new blank into alignment with the work arbor; the new blank is pushed onto the work arbor and chucked; the sliding base is returned to operative position; and the main motor of the machine restarted so that the newly-chucked blank may be cut. The slide, which carries the spools, is then shifted to bring a spool under the jaws of the transfer arm which has been newly indexed to the loading station; and these jaws are released to drop the completed gear, which is carried by them, onto the spool. Then the slide is shifted again to bring a spool carrying blanks under the jaws, the stack of blanks on the latter spool is lifted to place the uppermost blank on the stack between the jaws, and the jaws are closed to grip this blank. The slide is then returned to original position; and during its return movement the spool carrier or support is indexed so that a different blank-carrying spool and a different spool for completed gears, may be in position for the next cycle of operation of the loading mechanism. The loading cycle is thus completed, and the loading cycle motor is stopped.

Reference will now be had to the drawings for a more detailed description of the construction and operation of the shown embodiment of the invention.

Figure 5:
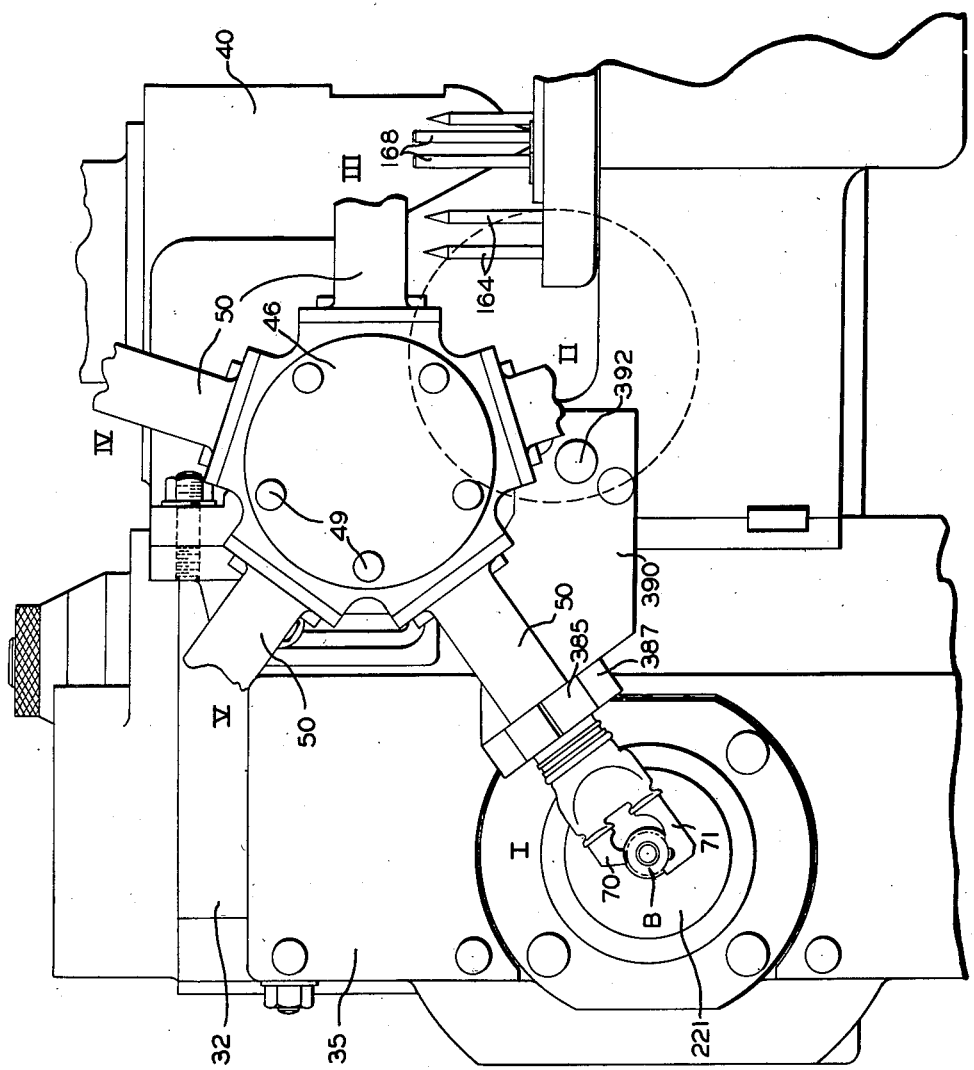
Fig. 5 is a fragmentary front elevation of the loading mechanism and of the work head of the machine.

25 denotes the base of the gear-cutting machine. 26 is the column of the machine and 27 denotes the cradle, which is journaled in the column. The cutter (not shown) is mounted upon a support 28 which is adjustable in the cradle. Also mounted upon the base 25 is a sliding base 30. Pivotally supported upon the sliding base 30 is an angularly adjustable plate 31. Mounted upon the plate 31 for rectilinear adjustment thereon is a column 32 upon which the work head 35 (Fig. 5) is mounted for the vertical adjustment. The work spindle 33 (Fig. 8) is journaled in the work head 35, the anti-friction bearings, which support the spindle at one end, being denoted at 34 in this figure. All of these parts may be of conventional construction and form no part of the present invention. They may be built as in the machine of the Stewart and Carlsen pending U. S. patent application Serial No. 779,890, filed October 15, 1947.

Secured to one side of the work head column 32 is a bracket or housing 40 which carries the loading mechanism of this invention. Mounted in this bracket for rotary and for axial reciprocatory movement is a spindle 42 (Fig. 8). This spindle is formed at its forward end with a flange 47. This flange carries a hub or head 48. The front end of this hub or head is closed by a cover plate 46. Bolts 49 serve to secure the hub and plate 46 and flange 47 together.

The periphery of the hub 48 is generally pentagonal in shape, and secured to the five faces of the hub are five sleeve or tubular members 50. These are fastened in place by bolts 51. Journaled upon spaced anti-friction bearings 53 and 54 (Fig. 7) in each of the tubular members 50 is a shaft 55.

Each shaft 55 has a bevel pinion 60 formed integral with it at one end. The several pinions 60 (Figs. 7 and 8) are adapted to mesh with a ring gear 61 that is fastened by screws 62 to the head of a tubular member 63 which is mounted within a recess or counterbore of the spindle 42 so that the spindle may rotate relative to it. The tubular member is keyed, as will be described further hereinafter, to a shaft 86 which is mounted centrally within tubular member 63 but is held against rotation with the tubular member. Rotation of the spindle 42, therefore, causes the pinions 60 to roll on the ring gear 61; and thereby the several shafts 55, that are journaled in the several tubular members 50, are rotated.

Mounted within each shaft 55 to rotate therewith is a supporting member 65. Each such member is formed at its front end with an enlarged head 66 which is provided with a pair of ears between which are pivotally mounted by means of pins 67 and 68 two gripping jaws 70 and 71. These jaws are removable and have their gripping surfaces shaped to conform to the external contour of the work which is to be cut, ground or otherwise treated on the machine on which the loading mechanism is used. Thus, as shown in Figs. 7 and 10, jaws 70 and 71 are recessed on their engaging surfaces as denoted at 73 and 76, respectively, so that they may engage and grip a work piece B or G simultaneously on its front and back cone surfaces 81 and 82. For better support the jaw 71 may be provided with two spaced gripping portions 83 (Fig. 7), each of which is recessed as denoted at 76 in Fig. 10. These gripping portions together with the single gripping portion 84 of jaw 70, which is recessed as indicated at 73, provide a three point support for a blank or a completed gear in the transfer operation.

Each pair of jaws 70 and 71 is adapted to be moved either to clamping or to released position by movement of a rod 77 which is reciprocable axially in the associated shaft 55 and supporting member 65. Each rod 77 has an enlarged generally oval-shaped head 78 at its forward end. This head engages between the associated pair of jaws 70 and 71. It spreads the jaws apart when the rod is moved forwardly in the associated shaft 55; and it closes the jaws when the rod is moved rearwardly in the associated shaft 55. Each rod is constantly urged rearwardly by a coil spring 79 that is interposed between the member 65 and a ring 80 that is pinned to the rod.

A rubber boot 72, which is secured at its rear end to the head 66 of associated member 65 by a retaining ring, and which is crimped at its forward end, as denoted at 75, to engage in external recesses in the jaws 70 and 71, serves to protect the operating parts of each pair of jaws from entry of dirt or grit.

The rods 77 have conical rear ends that engage the periphery of a cam member 85. This cam member is fastened to or is integral with a bar 86 that is mounted within the spindle 42 for axial reciprocation therein. The bar 86 is constantly urged forwardly of the spindle 42 by a coil spring 87 (Fig. 8) which is interposed between the rear end of the sleeve 63 and a guide shoulder 88 that is formed on the bar 86.

The cam 85 has two angularly spaced cam lugs 90 and 91 formed on its periphery. When the bar 86 is moved rearwardly in the spindle 42 from the position shown in Fig. 8 then the rear ends of two rods 77, which are at the time in registry with these cams, will ride up on these cams and be moved forwardly in their shafts 55 to release the gripping jaws 71 and 70 associated therewith. Since the head 48 is indexed on each cycle of operation of the loading mechanism, as will be described more fully hereinafter, it will be seen that the several rods 77 are brought successively into registry with cam portions 90 and 91. When a rod 77 is riding on the dwell or cylindrical portion of cam 85, the jaws associated with that rod are closed gripping a work piece. It is only when the rod rides on cam 90 or 91 that the jaws are opened. These two cam portions are of different axial length for a purpose which will hereinafter appear.

The rod 86 is adapted to be moved rearwardly to release the pair of gripping jaws which is at the work spindle position, and the spindle 42 is adapted to be reciprocated to strip a completed gear from the work spindle or to push a new blank thereon by operation of a rotary cam 100 (Figs. 4, 11, 12, and 13). This cam is formed with a peripheral rib 101 whose opposite sides 102 and 103 constitute cam surfaces.

The cam surface 102 is engaged by a roller 104 which is mounted upon a stud that is secured in a lever arm 106. This lever arm is secured by a set-screw 99 to a stud 107 that is journaled in lugs 108 and 109 formed on bracket 40. Mounted in the free end of the lever 106 is a stud 110 that carries a shoe 111. This shoe engages in the peripheral slot 112 (Fig. 8) formed in the spool 113 that is keyed to the spindle 42. This spool is held against axial movement relative to the spindle 42 by a nut 114 which threads onto the spindle and which holds the spool against a shoulder formed on the spindle.

The cam surface 103 is engaged by a roller 115 (Figs. 4, 11 and 12) which is mounted upon a stud 116 that is secured in a lever 118. This lever is forked to straddle lever 106 and is journaled on the stud 107. Mounted in the free end of the lever 118 is a stud 120 to which is fastened, or which has integral with it, a yoke 121. This yoke is adapted to straddle a spool 123 (Fig. 8); and the arms of this yoke engage in parallel chordal slots 122 cut in the spool, thereby holding spool 123 and the bar 86, to which it is secured, against rotation while effecting axial movement of this bar. Thus, gear 61, which is connected to the forward end of bar 86, is held against rotation as above described, while the bar may be reciprocated axially through the gear.

Thus, it will be seen that as the cam 100 is rotated reciprocatory movements will be imparted to the spindle 42 and bar 86, the periods when these movements occur in the cycle of operation of the loading mechanism and the extent of each of these movements depending upon the contours of the cam surfaces 102 and 103. Rollers 104 and 115 are held in engagement with the cam surfaces 102 and 103, respectively, by a coil spring 114 which is mounted on a rod 117 that is pivotally connected to lever 106. A nut 119 threaded on the rod permits adjustment of the tension of this spring.

Figure 4:
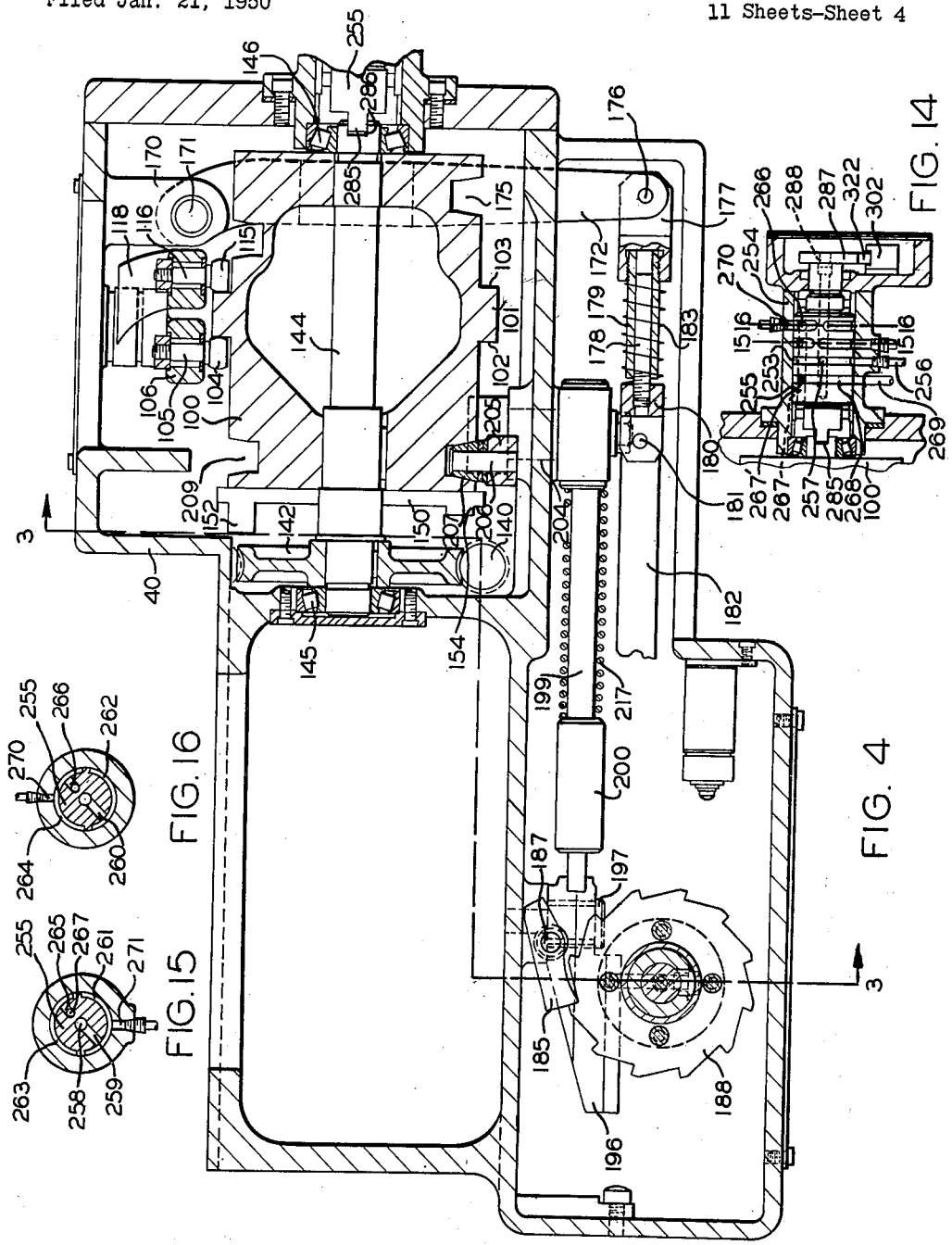
Fig. 4 is a horizontal sectional view through the loading mechanism taken substantially on the line 4—4 of Fig. 3.

The cam 100 is rotated a revolution for each loading operation. It is driven from a motor 130 (Fig. 1) that is mounted upon the top of the bracket 40. The motor is connected through a coupling 131 (Fig. 2) to a shaft 132 which is journaled on anti-friction bearings 133 and 134 in the bracket 40. A spur pinion 135 is formed integral with this shaft. This pinion meshes with a spur gear 136 that is keyed to a shaft 137 which is journaled on anti-friction bearings 138 and 139 in the bracket 40. The shaft 137 has a worm 140 integral with it. This worm meshes with the worm wheel 142 (Fig. 4). The worm wheel 142 is keyed to a shaft 144 that is journaled on aniti-friction bearings 145 and 146 in the bracket 40. The cam 100 is also keyed to this shaft.

The gripping jaws are adapted to transfer blanks from a magazine to the work spindle and to transfer completed gears from the work spindle to a magazine, the hub or head 48, on which the gripping jaws are mounted, being indexed step-by-step for this purpose. Indexing of the hub or head is effected by a Geneva mechanism comprising a driver 150 and a driven Geneva wheel 151 (Figs. 2, 3, 4, and 8). The driver 150 is bolted or otherwise secured to the cam 100. The driven member 151 is keyed to the spindle 42. This Geneva mechanism may be of any suitable type. That shown is of the form disclosed in the pending U. S. patent application of Olaf A. Johnson, Serial No. 136,210, filed December 31, 1949. In this mechanism, the driving disc 150 (Fig. 3) carries an axially projecting pin 152 which is adapted to engage in radial slots 153 of driven disc 151, successively, to effect the intermittent drive of spindle 42, and the driving disc 150 has an axially-projecting arcuate ridge 154 which is adapted to ride in radial slots of a flange 155 (Fig. 8), that is formed on driven disc 151, to hold the disc 151 and spindle 42 intermittently against rotation. Since drive member 150 is fixed to cam 100, it makes, like cam 100, a revolution during a loading cycle.

The magazine which carries the blanks and the completed work pieces comprises a rotatable support 160 (Fig. 3) which is journaled in a slide 161. Fastened to the top of the support 160 by screws 162 is a plate 163 in which are secured a plurality of circularly arranged, vertically disposed spools or spindles 164 that are adapted to receive the completed gears. These spindles are preferably sharp-pointed at their upper ends, being provided with conical upper ends 165, so that they can readily enter the bores of the completed gears as the gears are dropped on them. Mounted in the plate 163 is another set of circularly arranged, vertically disposed spools or spindles 168 which are adapted to carry the blanks that are to be cut. These may have more blunt upper ends because the blanks are lifted up off them, not dropped onto them.

The group of pins 168 is concentric with the group of pins 164 and disposed radially within the group of pins 164.

The slide 161 is reciprocated so that a spindle 164 and a spindle 168 can be brought successively into registry with a pair of gripping jaws so that these jaws may first drop a completed gear onto a spindle 164, and then take a blank from a spindle 168 during a cycle of operation of the loading mechanism. The reciprocating movement of the slide 161 is effected through operation of the cam 100. Pivotally mounted by means of pin 171 upon a lug 170 (Fig. 4), which is integral with bracket 40, is a lever 172. This lever carries a roller 174 which engages in the cam slot 175 of the cam 100. The lever is pivotally connected at its free end by means of a pin 176 with a forked member 177 that is rigidly fastened to a sleeve 179. A rod 178 slides within sleeve 179. This rod 178 is fixedly connected to a link member 180. A spring 183 surrounds sleeve 179, and is interposed between members 177 and 180. The link member 180 is pivotally connected by means of pin 181 with a bar 182 that threads into the slide 161 (Fig. 6). Thus, as the cam 100 rotates, reciprocatory movement is imparted to the slide 161 and to the magazine carried thereby.

As already stated, the magazine is indexed during each loading cycle so that completed gears are dropped on different spools 164 on successive loading cycles and new blanks are taken off different spools 168 on successive loading cycles. The reciprocatory movement of the slide 161 is employed to index the magazine. There is a pawl 185 (Figs. 3 and 4) pivotally mounted upon the bracket 40 and constantly urged in one direction by a torsion spring 186. This spring is connected at one end to the stud 187, upon which the pawl is journaled, and is connected at its opposite end to the pawl.

The pawl is adapted to engage the teeth of a ratchet wheel 188 which is secured to the rotary support 160 by screws 189. As the slide 161 moves to the left in Fig. 4, the pawl 185 will ratchet idly over the teeth of the ratchet wheel against the resistance of the spring. When the slide 161 is returned to the right, however, the pawl will engage the ratchet wheel and index the support 160.

To bring the blanks, which are on the spindle 168, which is at delivery position, up into registry with the gripping jaws 70 and 71 of the transfer arm 59 which is at that time at the loading position, a forked lifting member 190 (Figs. 3 and 6) is provided. This forked member is adapted to straddle the several spools 168 successively as they are indexed into registry with the lifting member. To permit the spools 168 to clear the tip of the lifting member during indexing of plate 163, the spools are mounted in goosenecks 191 (Fig. 3) which in turn are mounted in plate 163.

The lifting member 190 is fastened to a sleeve 193 that is reciprocated axially in the support 160. This sleeve carries a pin 194 (Figs. 2 and 3) at its lower end which engages in the groove 195 of a bell-crank lever 196. This lever is pivotally mounted by means of a stud 197 on the bracket, the stud threading into the bracket. The short arm of this lever is pivotally connected by means of a pin 198 with a coupling member 200. This coupling member is slidably connected with a rod 199, the rod sliding in a recess 192 in the coupling member and carrying a pin 199' that engages in said recess and prevents disconnection of the rod from the coupling member.

The rod 199 has a threaded connection at its right hand end with a forked head 201 which is pivotally connected by means of the pin 202 with an arm 203. This arm is pivotally mounted in the bracket 40 by means of a stud 204. On the inside end of this stud there is pivoted another arm 205. This arm carries at its free end by means of pin 206 a roller 207. This roller engages in a cam groove 209 of the cam 100.

Figure 3:
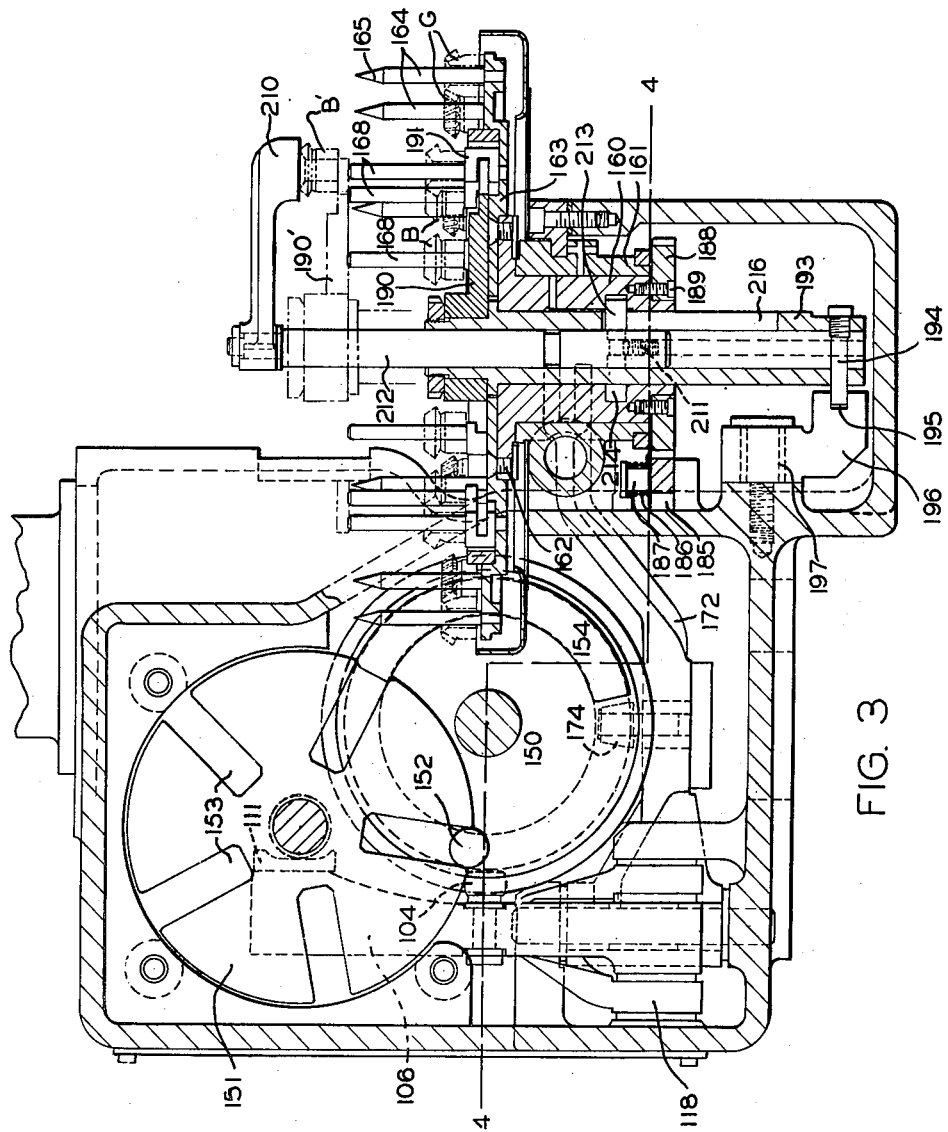
Fig. 3 is a transverse sectional view through the loading mechanism taken on the line 3—3 of Fig. 4 looking in the direction of the arrows.

As the cam 100 rotates, therefore, the bell-crank lever 196 is rocked to actuate the forked member 190 (Figs. 3 and 6) to lift the stack of blanks on the spool 168, which is at delivery position, up into alignment with the gripping jaws of the transfer arm, which is at that position, so that the topmost blank can be engaged by the gripping jaws. Fig. 3 shows in dotted lines at 190' the raised position of arm 190, the blank, which is being lifted, being denoted at B'. Other blanks on the different spools 168 are designated at B, and completed gears on the different spools 164 are denoted at G.

A stop arm 210 is provided to provide an upper limit to the movement of the blanks so as to insure that the blanks are correctly positioned between the gripping jaws. This stop arm 210 (Figs. 2, 3 and 6) is carried by a rod 212 which is mounted in the bore of the sleeve 193. To prevent upward movement of the arm 210 when the sleeve 193 is raised, there is a pin 213 secured by a set-screw 211 in the rod 212. This pin is adapted to engage in an internal groove 214 formed in the rotary support 160. A slot 216 is provided in one side of the sleeve 193 in which the pin 213 may slide so that sleeve 193 may move up or down.

Each spool 168 is adapted to carry a plurality of blanks when the magazine is newly loaded. As the cutting operations proceed, blanks are taken off the spools 168, chucked on the work spindle, cut, and transferred, as completed gears, to the spools 164. Obviously, the stack of blanks on any spool 168 does not have to be lifted as far to position the topmost blank between the gripping jaws of a transfer arm, when the spool is fully loaded, as when there are fewer blanks on the spool. A coil spring 217 (Figs. 2 and 4) serves to provide the necessary flexibility in upward travel of the forked member 190. This spring is interposed between the coupling 200 and the headed member 201.

The chucking mechanism for securing a blank to the work spindle of the machine may be of any suitable structure. One type of chucking mechanism that may be employed is shown in Fig. 8. This comprises an expansible collet 220 which has a plurality of spring fingers that are adapted to enter the bore of the work piece. The collet is threaded into the work arbor 221 which has a pressed fit in the bore of the work spindle 33. The spring fingers of the collet are adapted to be moved to or from gripping position by movement of a headed rod 223. This rod threads into a bar 224 and is secured therein by a set-screw 226 which is accessible through slot 227 in the collet. The bar 224 has a threaded connection with the draw-bar 225. The bar 224 is movable axially in the collet and is guided by the collet in its movement. The collet is bored to permit movement of bar 224 sufficient to expand and release the collet on movement of the bar in opposite directions.

The draw bar 225 is adapted to be actuated by fluid pressure. For this purpose it is secured to a position 230 (Fig. 18) which is reciprocable in a cylinder 231.

The sliding base 30 (Fig. 1) of the machine is also adapted to be reciprocated by fluid pressure. To this end a piston 235 (Fig. 18) is provided. This piston is reciprocably mounted in a cylinder 236 that is secured to the side of the base 25 (Fig. 1) of the machine. This piston is provided with rack teeth 237 (Figs. 18 and 19) that mesh with a spur pinion 238. This pinion is secured to a shaft 233 that has a spur gear segment 234 formed integral with it. The segment meshes with a rack member 239 secured to the under side of the sliding base 30.

The movement of the sliding base is controlled by a solenoid operated valve 240 (Fig. 18). This valve is adapted to slide in a valve casing 241. During the first part of the loading cycle until after a new blank has been placed on the work spindle, the valve 240 is held in the position shown in Fig. 18 by a coil spring (not shown). In this position, the oil or other motive fluid is pumped from a sump in the base of the machine by means of the pump 245 through the duct 246 and is delivered by the pump through duct 247 to valve casing 241, whence it passes through duct 248 to the left hand side of the piston 235. The right hand side of cylinder 236 is then on exhaust through duct 249 and duct 250, the last-named duct leading back to the sump.

When a new blank has been placed on the work spindle, the solenoid 242 is energized, as will be described more particularly hereinafter. The valve 240 is then shifted to the right. The motive fluid then flows from the duct 247 through the duct 249 to the right hand end of the piston 235, and the left hand end of the cylinder 236 is on exhaust through the duct 248 and the duct 251. The latter duct leads back to the sump of the machine.

At opposite ends of its reciprocating movement the sliding base 30 trips the normally-open limit switches 300 and 340 (Figs. 1 and 20), respectively. These may be actuated by a lever 243 secured to the shaft 233 as shown diagrammatically in Figs. 18 and 19, or they may be operated by a pin secured directly to piston 235 as shown in Fig. 1.

In a cycle of operation of the loading mechanism, the completed gear is dechucked, transferred to a spool 264, and a new blank is lifted off one of the spools 268, transferred to the work spindle, and chucked. The chucking mechanism, has, therefore, to be operated in time with the operations of the other parts of the loading mechanism. The chucking mechanism is controlled by a rotary valve 255 which is rotatably mounted in casing 254 (Figs. 14, 15, 16 and 18). The pressure fluid is supplied to this valve through the duct 256. The duct 256 communicates with a groove 253 which extends around the periphery of the valve. This groove communicates through radial ducts 257 with an axially extending duct 258. The duct 258 communicates through axially-spaced radial ducts 259 and 260, respectively, with axially-spaced grooves 261 and 262, respectively, each of which extends part way only around the periphery of the valve. Lying in the same axial planes as grooves 261 and 262, respectively, are other grooves 263 and 264, respectively. These also extend part-way only around the periphery of the valve. Grooves 263 and 264 communicate with radial ducts 265 and 266, respectively. The ducts 265 and 266 communicate with a duct 267 that extends longitudinally of the valve parallel to duct 258. A radial duct 267' leads from this duct 267 into a peripheral groove 268 that communicates with a duct 269 that leads back to the sump.

Ducts 270 and 271 lead from the rotating valve 255 to a reciprocatory manually operable valve 275. This valve is reciprocable in a ported sleeve 276 within the valve chamber 277. The valve 275 is constantly pressed toward the position shown in Fig. 18 by a coil spring 278. It may be manually moved to the right, to release the chucking mechanism at any time, by pressing on knob 283. Ducts 280 and 281 connect the valve 275 with opposite faces of the piston 230 which operates the chuck. Ducts 282 and 284 lead from valve 275 back to the sump.

In the shown positions of valves 255 and 275, the line 270 is on pressure, supplying the line 280 which leads to the left hand side of the cylinder 231. The right hand side of this cylinder is on exhaust through the line 281, and the line 282 which leads back to the sump. Thus the work is chucked. When the valve has rotated to a position to put line 270 on pressure from duct 256 through groove 253, radial ducts 257, longitudinal duct 258, radial duct 260, and groove 262, the pressure fluid is supplied from line 270 through the line 281 to the right hand side of the cylinder 231 to move the draw bar 225 forwardly to de-chuck the work.

The valve 255 is coupled directly to the cam shaft 144 to rotate therewith through a tooth 285 and a groove 286 in which the tooth engages (Figs. 4 and 14). Tooth 285 is integral with the inner end face of valve 255; and groove 286 is formed on the opposed end face of cam shaft 144. Secured to the outer end face of valve 255 by a bolt 288 is a cam 287 which is adapted to operate a double-pole switch 302 (Figs. 14 and 20), whose purpose will be described more fully hereinafter. This switch is normally open, but during a cutting cycle the switch is held closed by cam 287. The peripheral surface of cam 287 is so shaped, however, that as soon as the loading cycle begins the switch is allowed to open and it is not closed again until the loading cycle is completed.

Figure 20:
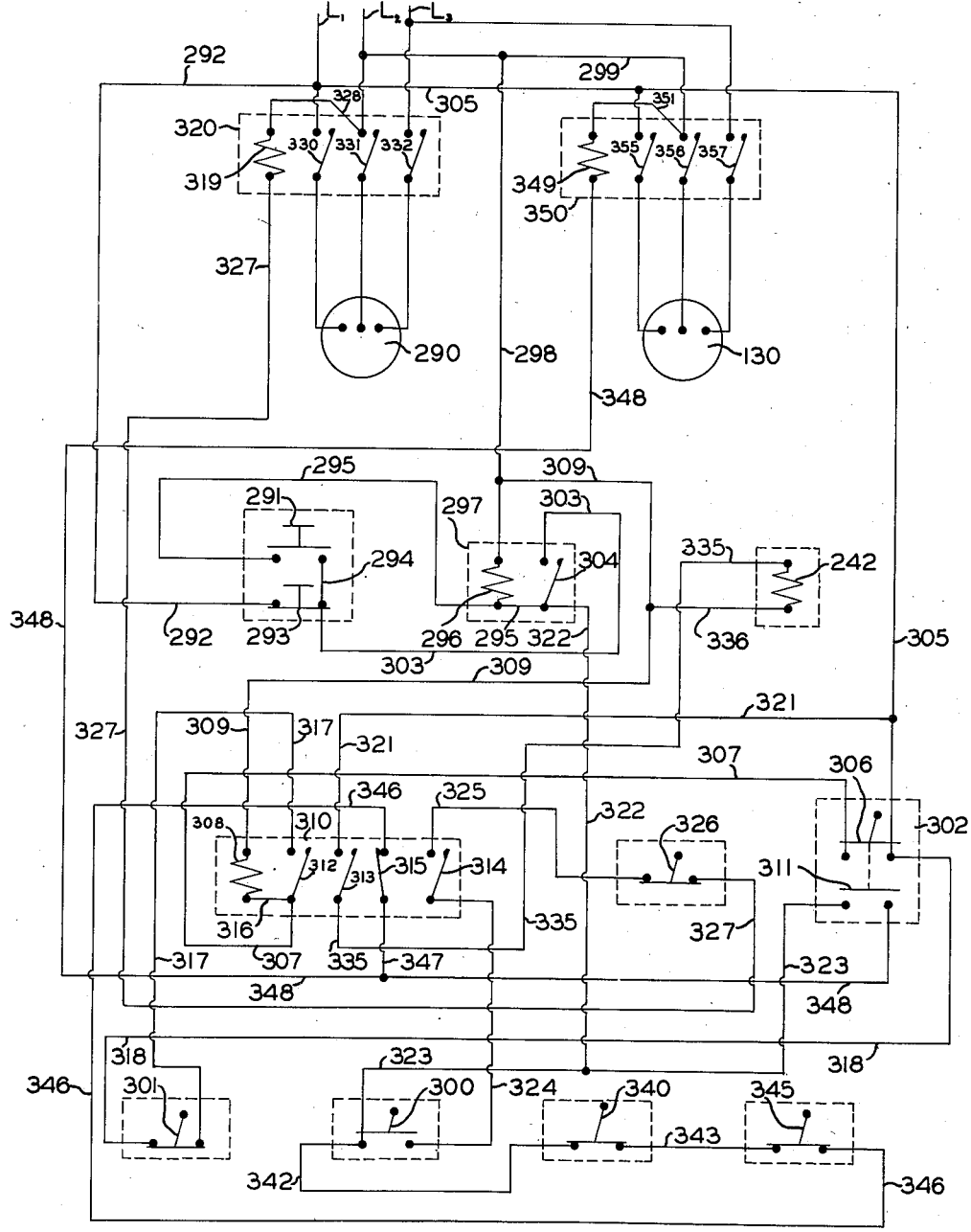
Fig. 20 is a diagrammatic view showing one way in which the machine may be wired electrically to perform its functions.

One way in which the machine may be wired electrically to accomplish its purpose is shown diagrammatically in Fig. 20.

Assuming that the machine has stopped at the completion of a loading cycle with the sliding base 30 in its withdrawn, inoperative position, to start the normally-open start button 291 is closed. This closes a circuit to coil 296 of a conventional relay 297, this circuit being from main line L1 through line 292, normally-closed stop button 293, line 294, start button 291, line 295, coil 296 and lines 298 and 299 to main line L2. This energizes coil 296 and closes arm 304 of relay 297. The circuit to coil 296 is, therefore, maintained, when the start button is released, from main line L1 through line 292, stop button 293, line 303, arm 304, line 295, coil 296 and lines 298 and 299 to main line L2.

With the arm 304 closed, a circuit is made to the coil 349 of a conventional controller 350. This circuit is from main line L1 through line 292, stop button 293, line 303, arm 304, lines 322, 323, and 342, now-closed limit switch 340, line 343, a switch 345, line 346, arm 315 of a conventional relay 310, lines 347 and 348, coil 349, and lines 351 and 299 to main line L2. This closes arms 355, 356 and 357 of controller 350 and starts loading mechanism drive motor 130. The switch 345 may be operated by the conventional feed cam (not shown) of the machine, namely, the cam which produces successively feed of the cutter into the work for cutting of a tooth surface, dwell of the cutter in engagement with the work during generation of the tooth surface, withdrawal of the cutter away from the work, and dwell of the cutter in withdrawn position during indexing of the work.

With the start of the loading cycle motor 130, the loading cycle begins; the completed gear is removed from the work spindle; and a new blank is chucked thereon, all as will be described further hereinafter. When this portion of the loading cycle is completed, however, the cam 287 (Fig. 14) closes double-pole switch 302.

The closing of double-pole switch 302 closes a circuit to coil 308 of a conventional relay 310, this circuit being from main line L1 through line 305, arm 306 of switch 302, lines 307 and 316, coil 308 of relay 310, and lines 309, 298 and 299 to main line L2. This energizes coil 308 and closes switch arms 312, 313, and 314 and opens switches 315 of relay 310.

With arm 313 closed a circuit is made to solenoid 240 from main line L1 through lines 305 and 321, arm 313, line 335, solenoid coil 242, and lines 336, 309, 298 and 299 to main line L2. This energizes solenoid 242 and moves valve 240 to the position shown in Fig. 18, causing the sliding base 30 to be moved to and maintained in working position.

When the sliding base moves away from loading position, limit switch 340 opens. When the sliding base reaches working position, limit switch 300 is closed. With the closing of limit switch 300, a circuit is made from main line L1 through line 292, stop button 293, line 303, now-closed arm 304, lines 322 and 323, now-closed limit switch 300, line 324, now-closed arm 314 of relay 310, line 325, a switch 326 which was closed on chucking of the new blank as will be described further hereinafter, line 327, coil 319 of a conventional controller 320, and line 328 to main line L2. This energizes coil 319, closes switch arms 330, 331 and 332, and starts main motor 290. The machine then commences its cutting cycle.

Despite opening of switch arm 315 of relay 310 and despite the opening of limit switch 340, the loading cycle motor continues in operation, for the circuit to coil 349 of controller 350 is maintained through now-closed double-pole switch 302. This circuit is from main line L1 through line 292, stop button 293, line 303, closed arm 304, lines 322 and 323, now-closed arm 311 of switch 302, line 348, coil 349, and lines 351 and 299 to main line L2. The loading mechanism therefore, continues its operation, dropping a completed gear on one of the spools 164 and picking up a new blank from one of the spools 168 as will further be described hereinafter. The cam 287 (Fig. 14) again rotates into position to allow double-pole switch 302 to open. This breaks the circuit to the loading cycle motor 130, stopping this motor.

When the arm 312 of relay 310 has been closed, as above described, a hold-in circuit to coil 308 of this relay is established this circuit being from main line L1 through lines 305 and 318, automatic stop switch 301, line 317, arm 312, line 316, coil 308, and lines 309, 298 and 299 to main line L₂. When double-pole switch 302 opens, then, on completion of the loading cycle, the circuit to coil 319 of main motor controller 320 is maintained, this circuit being from main line L₁ through line 292, stop button 293, line 303, arm 304, lines 322 and 323, now-closed limit switch 300, line 324, now-closed arm 314, line 325, limit switch 326, line 327, coil 319, and line 328 to main line L₂.

At the end of the cutting cycle, when the operations on the gear have been completed, the automatic stop mechanism of the machine, which may be of conventional construction, is tripped. This breaks the hold-in circuit to coil 308, deenergizing this coil and breaking the circuit to coil 319 of controller 320. This stops the main drive motor 290. It also breaks the circuit to solenoid 242; valve 240 (Fig. 18) is therefore shifted under actuation of its spring (not shown) to reverse piston 235 and cause the sliding base 30 to be withdrawn to loading position.

As soon as the sliding base moves away from working position limit switch 300 is allowed to open. The sliding base continues to move on out to loading position, however, because it is moving under fluid pressure applied to the right hand end (Fig. 18) of piston 235. When the sliding base reaches loading position, limit switch 340 is closed.

This causes the loading cycle motor 130 to be restarted, the circuit to coil 349 of controller 350 being made, upon closing of limit switch 340, from main line L₁ through line 292, stop button 293, line 303, arm 304, line 322, 323 and 342, now-closed limit switch 340, line 343, limit switch 345, line 346, arm 315 which has reclosed upon deenergizing of coil 308 of relay 310, lines 347 and 348, coil 349, and lines 351 and 299 to main line L₂.

Thus, when the machine is once started it will go through its cycles of loading and cutting indefinitely until it runs out of blanks or an improper blank is chucked, in both of which cases limit switch 326 will fail to close, or until the cutter feed cam fails to stop at the end of a cutting cycle in the proper position in which case limit switch 345 will fail to close.

The operation of the loading mechanism will be summarized now.

There are as stated five transfer arms 50 which are equiangularly spaced. During cutting, one of these arms is at the loading station, another is at the working station, and the other three are at intermediate points. For the purpose of description, the working station will be called station I (Fig. 7). The loading station is then station III. The head 48 is indexed counterclockwise as viewed in Fig. 7, the transfer arm, which carries the completed gear, travelling in its first indexing step to station II and in its second indexing step to station III where it drops the completed gear on one of the spools 164 (Figs. 2, 3 and 6) and picks up a new blank from one of the spools 168. The transfer arm carrying the new blank is then indexed successively through stations IV and V back to station I where it loads the new blank on the work spindle. It remains at station I during cutting of the blank, the gripping jaws 70 and 71 associated with the transfer arm still straddling the blank but being open sufficiently to permit the blank to rotate on its axis for generation of the tooth profiles and for indexing. During each index of head 48, the pinions 60 (Figs. 7 and 8) associated with the several transfer arms 50 ride on stationary gear 61. Thus during each index of head 48, the transfer arms are partially rotated. It is this partial rotation that moves the jaws from axial alignment with the work spindle at station I through 90° to station III and vice versa.

Figure 17:
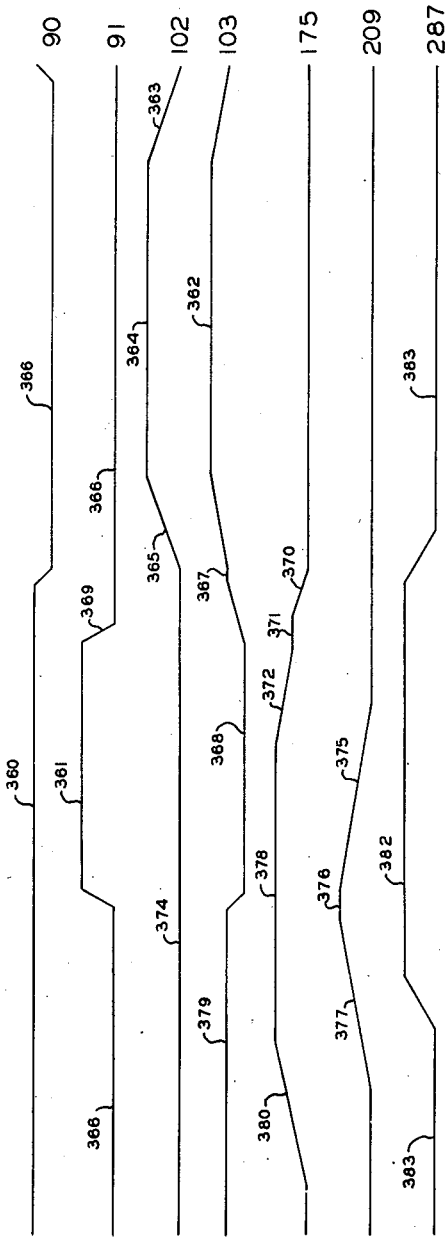
Fig. 17 is a diagrammatic view showing layouts of the several tracks of the control cam.

The pair of gripping jaws 70 and 71 which are straddling the workpiece, that is on the workspindle, are held open during the gear-cutting operation because the rod 77 which is associated with this pair of jaws is still riding on the top 360 (Fig. 17) of cam lug 90 (Fig. 8). The pair of gripping jaws 70 and 71 which are carried by the transfer arm, that is at the loading station, are, however, closed because during cutting the bar 86 (Fig. 8) is about midway of its stroke and the rod 77 which is associated with the pair of jaws, that is at the loading station, has ridden down off the top portion 361 (Fig. 17) of cam lug 91 (Fig. 8). The other three pairs of gripping jaws 70 and 71 which are at stations II, IV and V are closed because the rods 77, which are associated with the transfer arms 50, that carry these pairs of jaws, are riding on the cylindrical peripheral portion of head 85 (Fig. 8).

When the cutting operations on the work have been completed, the automatic stop of the machine is tripped. This opens limit switch 301, deenergizing solenoid 242. This causes valve 240 (Fig. 18) to be shifted, shifting piston 235 and causing the sliding base 30 to be withdrawn to loading position. Upon movement of the sliding base away from operative position, limit switch 300 (Figs. 18 and 20) opens, breaking the circuit to coil 319 of main motor controller 320 and stopping the main drive motor 290.

The automatic stop switch 301 is opened only momentarily and closes again immediately thereafter, this being the method of functioning of the conventional automatic stop. Once the sliding base has started to move to loading position, however, the base continues to move to that position under fluid pressure.

When it reaches loading position limit switch 340 is closed, and the loading drive motor 130 is started, starting rotation of the cam 100. As the cam 100 rotates the roller 115 (Fig. 11) rides down the lobe 362 (Fig. 17) of the cam 103, causing the bar 86 (Fig. 6) to be shifted to the left. This permits the rod 77 to ride down off the high portion 360 (Fig. 17) of cam lug 90 (Fig. 8) onto the cylindrical peripheral surface 366 (Fig. 17) of head 48 (Fig. 8) allowing the gripping fingers 70 and 71 of the transfer arm which is at the work station III to close, thus gripping the completed gear. The roller 104 (Figs. 12 and 13) now rides up the rise 363 (Fig. 17) of the cam surface 102 of the cam 100 onto the cam portion 364.

While this is occurring rotary valve 255 (Figs. 14, 15, 16 and 18), which is connected to cam 100 to rotate therewith, will have rotated far enough for line 281 (Fig. 18) to be put on pressure and line 280 to be put on exhaust. This will cause drawbar 225 (Figs. 18 and 8) to be moved to the left, releasing the completed gear G.

As soon as the roller 104 (Figs. 12 and 13) rides onto the cam portion 364 (Fig. 17) of cam surface 102, then, the spindle 42 will be moved to the left in Fig. 8, stripping the gear, which is now gripped between a pair of jaws 70 and 71, from the work spindle. As the cam 100 continues to rotate, the Geneva mechanism 150—151 (Fig. 3) operates to index the head 48 which carries the transfer arms 50. This moves the newly completed gear from station I to station II, and the previously completed gear from station II to station III. It also moves the transfer arms 50 from stations III, IV and V, respectively to stations IV, V and I, respectively, thus bringing a new blank B to work station I.

During this time the roller 104 (Figs. 12 and 13) is riding on portion 364 (Fig. 17) of cam track 102 and the head 48 is held to the left in Fig. 8. After completion of the indexing operation, when a new blank has been brought into axial alignment with the work spindle by movement of a transfer arm 50 from station V to station I, the roller 104 (Fig. 12) will in the continued rotation of cam 100 ride down the portion 365 (Fig. 17) of the cam track 102 onto the portion 374 thereof. This will cause the head 48 to move back to the right as viewed in Fig. 8, pushing the new blank, which has been indexed to loading position, on to the collet 220 (Fig. 8).

Figure 2:
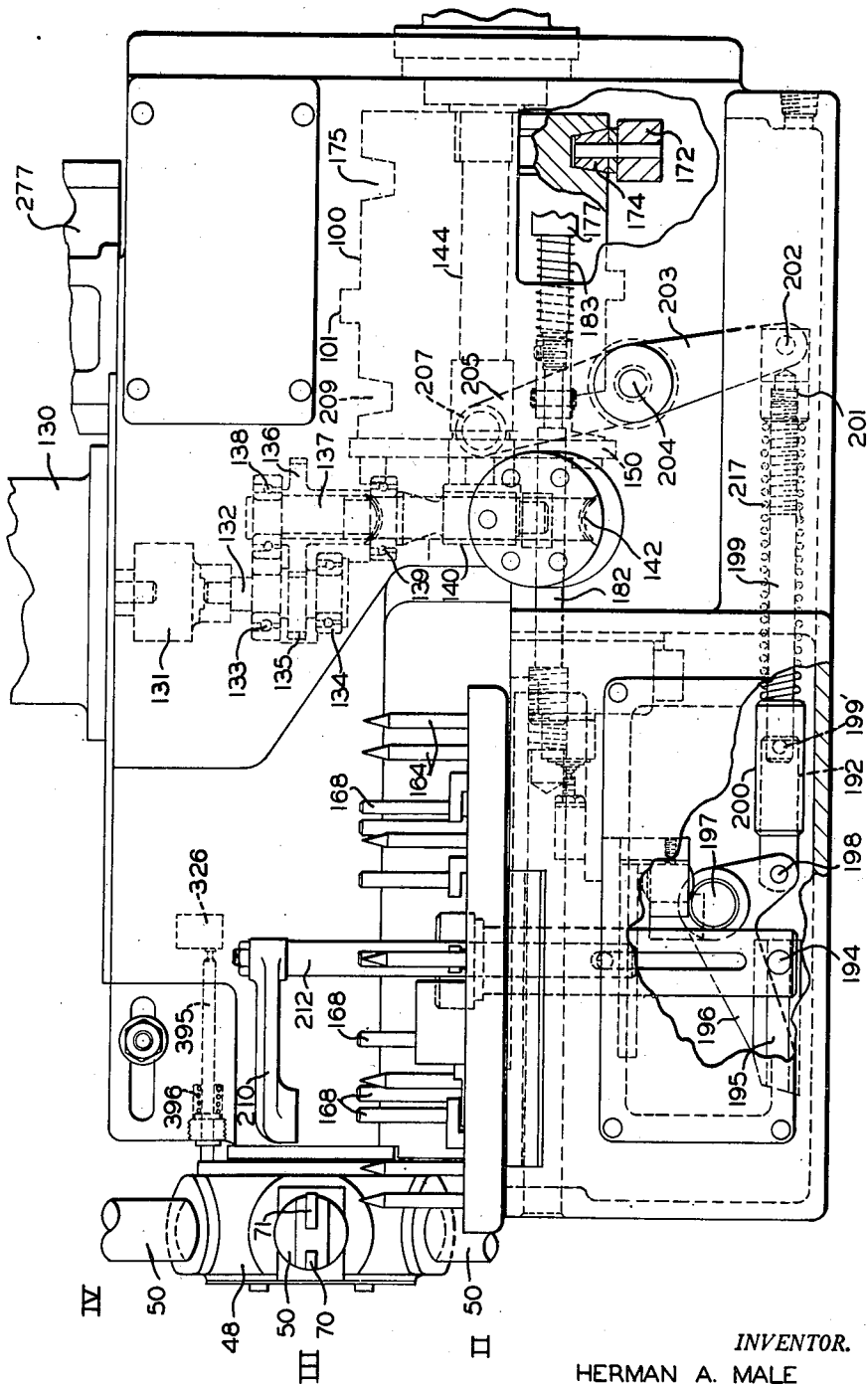
Fig. 2 is a side elevation on an enlarged scale of the loading mechanism, parts being broken away and two of the arms again being shown only fragmentarily.

Each of the transfer arms has a block 385 (Fig. 9) secured to it by a split clamp operated by a bolt 386. At the working station I there is a centering fork 387 (Figs. 5, 7 and 9) secured by a screw 388 and dowel pins 389 to the face of bracket 40 by bolts 392. As the head 48 thus moves to the right, the block 385 carried by the transfer arm enters the fork 387. This aligns the clamping jaws 70 and 71 of the transfer arm 50 with the work spindle so that the blank goes readily onto the collet 220. As the head 48 moves to the right, also, the back of plate 47 (Fig. 8) engages rod 395 (Fig. 2) and, if the blank is properly bored and properly seated on the collet, forces that rod to the right against the resistance of spring 396, forcing that rod to close limit switch 326 (Figs. 2 and 20).

If the blank does not seat properly on the collet, rod 395 is not moved far enough to close limit switch 326 so that the main motor 299 cannot be started. The limit switch 326 also will stop the machine when the machine runs out of blanks because then no blank will be loaded on the collet at station I, rod 395 will not be pushed to the right, and limit switch 326 will not be closed. Rod 395 reciprocates in a bore in bracket 40; and spring 396 surrounds rod 395 and is housed in a coaxial counterbore in this bracket.

Immediately thereafter the roller 115 (Figs. 11 and 12) will ride down off the portion 362 (Fig. 17) of cam track 103 onto the portion 367 of that track. This will allow the bar 86 (Fig. 8) to move back to the right under pressure of spring 87. The rod 77, which is associated with the transfer arm 50, that is at the work station I, will therefore ride up on the top 360 (Fig. 17) of cam lug 90. This lug is not as high as lug 91 and the jaws 70 and 71 of the transfer arm, which is at work station I, will therefore be loosened from engagement with the work but will not be fully opened.

While this is occurring the valve 255 (Figs. 14, 15 and 16) will have rotated to a position to put line 280 (Fig. 18) back on pressure, and line 281 on exhaust. Thus drawbar 225 (Figs. 18 and 8) will be pulled rearwardly in the work spindle 33 to expand collet 220 and chuck the new blank on the work spindle.

While the work is being chucked, the solenoid 242 (Fig. 20) will be energized, as described above, and valve 240 will be shifted back to the position shown in Fig. 18. This will cause the sliding base 30 (Fig. 1) to return to operative position. As the sliding base 30 moves away from loading position, limit switch 340 opens. When the sliding base reaches operative position, limit switch 390 is closed, starting main drive motor 299. The machine starts therefore to cut the new blank.

While the cutting operation is proceeding, the roller 174 (Fig. 2) of lever 172 (Figs. 2 and 4) rides into the portion 370 (Fig. 17) of cam groove 175 of cam 100. This causes the slide 161 (Figs. 3 and 6), which carries the spool holder 160, to be moved to the left in Fig. 6 to bring one of the spools 164 under the pair of jaws 70–71 (Fig. 2) which is carried by the transfer arm 50 that is then at the loading station III.

The roller 115 (Figs. 11 and 12) now rides up on the portion 368 (Fig. 17) of cam track 103, causing bar 86 (Fig. 8) to be shifted further to the left to cause the rod 77 of the transfer arm 50, which is at loading station III to ride up rise 369 (Fig. 17) of cam lug 91 (Fig. 8) opening the jaws 70 and 71 associated with that arm. The completed gear G carried by the jaws is, therefore, dropped on the registering spool 164. This occurs while roller 174 (Fig. 2) is riding on part 371 (Fig. 17) of cam groove 175 (Figs. 2 and 4) of cam 100.

The gripping jaws of the transfer arm at loading station III remain open while roller 174 is riding in the portion 372 (Fig. 17) of cam groove 175 (Figs. 2 and 4). Thus the gripping jaws remain open while slide 161 (Figs. 3 and 6) is being shifted further to the left to bring a spool 168 under the gripping jaws of this transfer arm which is at station III (Fig. 2).

The roller 207 (Fig. 2) now rides in the portion 375 (Fig. 17) of cam groove 209 of cam 100. This causes bell-crank lever 196 (Fig. 2) to lift fork 190 (Figs. 3 and 6) which lifts the stack of blanks on the spool 168 that is under the set of gripping jaws that is at station III. Stop arm 210 stops this movement. Thus the topmost blank on the stack is brought into registry with the gripping jaws.

The roller 115 (Figs. 11 and 12) now rides onto the portion 379 (Fig. 17) of cam track 103, and bar 86 (Fig. 8) is shifted back to the left far enough to allow the rod 77 of the transfer arm 50, which is at loading station III, to ride down off cam lug 91 but not far enough for the rod 77, of the transfer arm 50, which is at work station I, to ride down off cam lug 90. Thus, the gripping jaws 70 and 71 of the transfer arm, which is at loading station III, are closed but the gripping jaws 70 and 71 of the transfer arm, which is at work station I, remain loosened.

The roller 207 (Fig. 2) now rides down the portion 377 (Fig. 17) of cam groove 209 and lifting fork 190 (Figs. 3 and 6) drops down to its inoperative position.

The roller 174 (Fig. 2), which has been riding on the portion 378 (Fig. 17) of cam groove 175, now rides down portion 380 of this cam groove, causing slide 161 (Figs. 3 and 6) to return to the right. This causes ratchet wheel 128 (Fig. 4) to engage pawl 125 and to be indexed by this pawl. This indexes magazine spool holder 160 bringing a new pair of spools 164 and 168 into position to receive a completed gear and supply a new blank on the next cycle of operation of the loading mechanism.

The cycle of operation of the loading mechanism is now complete and cam 287 (Figs. 14 and 18) will now have rotated far enough for the roller of double-pole switch 302 (Fig. 20) to ride down off the lobe 382 (Fig. 17) of cam 287 onto the low portion of that cam, causing the double-pole switch 302 to open again, breaking the circuit to motor 130 and stopping that motor. The main drive motor 290 continues to run, however, until all of the tooth surfaces in the gear have been cut. Then the automatic stop trips; opening switch 301 and deenergizing solenoid 242. This allows valve 240 (Fig. 18) to shift back to the right again from the position shown in Fig. 18, moving the sliding base to loading position. When the sliding base reaches loading position, limit switch 340 (Fig. 20) is closed again, and the loading cycle motor 130 is restarted to start another loading cycle.

In this cycle, as before, the gripping jaws of the transfer arm 50, which is at the work station I, are first closed to grip the completed gear G, which is on the work spindle. The gear is then released from the arbor. The spindle 42 is then moved to the left in Fig. 8, so that the gripping jaws strip the gear from the collapsed work spindle collet 220 (Fig. 8). The head 48 is then indexed to move the completed gear from station I to station II, and to move the previously completed gear from station II to loading station III. Simultaneously, of course, the blank, which has been picked up by the clamping jaws 70 and 71 of the transfer arm 50 at the loading station III in the preceding cycle of operation of the loading mechanism, is moved to station IV, the blank, which has been at station IV, is moved to station V, and the blank, which has been at station V, is moved to station I. The head 48 (Fig. 8) will then be moved back to the right to push this last-named blank onto the collapsed work spindle collet 220. The drawbar 225 will then be actuated to expand collet 220 and chuck the new blank. The sliding base 30 will now be returned to operative position, and main drive motor 290 will be started, to start the cutting of the new blank. While the cutting is proceeding, the slide 161 (Figs. 3 and 6), which carries the spools 164 and 168, will be actuated to move one of the spools 164 into registery with the transfer arm 50 that has just been indexed to loading station III. This arm has turned through an angle of 90° about its own axis in its movement from station I to station III. Its jaws 70 and 71 are opened, then, and the completed gear, that has been carried by the arm, is dropped on the registering spool 164. The slide 161 is then moved a step further to bring a spool 168 under this set of gripping jaws. The stack of blanks on this spool 168 is then lifted by fork 190 up between these gripping jaws and the jaws are closed to grip the topmost blank on the stack. The slide 161 is then returned to inoperative position and as it returns, the spool holder 164 is indexed. The loading cycle is thus again completed, and again the loading cycle motor is stopped.

While the loading mechanism has been described as used on a gear cutting machine it will be understood that it may be employed on other types of machines used in the production of gears as, for instance, gear grinding, gear lapping, gear burnishing, and gear testing machines. In fact, it may be employed in loading and unloading of other types of workpieces also on machines on which work is to be performed on those workpieces. The gripping jaws can be shaped to suit the shape of the work to be handled, and the number of transfer arms, amounts of their movement and of the movement of the spool slide, etc. can be modified within the scope of the invention to suit the work which is to be handled.

While the invention has been described in connection with a specific embodiment thereof, therefore, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In combination, a work support, a holder adapted to hold a plurality of finished workpieces, a holder adapted to hold a plurality of blanks, a transfer member, means for moving the transfer member from the work support to a loading station and back, and means for moving the two holders successively into register with the transfer member, when the transfer member is at the loading station, so that the transfer member may deliver a finished workpiece to the first holder and may take a new blank from the second holder.

2. In combination, a work support, a magazine comprising two concentric rows of workpiece holders, the workpiece holders of one row being adapted to hold finished workpieces and the workpiece holders of the other row holding blanks, a transfer member, means for moving the transfer member from the work support to a loading station and back, means for effecting a reciprocatory movement between the magazine and the transfer member, while the transfer member is at the loading station, to bring a workpiece holder for finished workpieces and a workpiece holder for blanks successively into registry with the transfer member so that the transfer member may deliver a finished workpiece to the first workholder and may take a new blank from the second workholder.

3. In combination, a work support, a magazine comprising two concentric rows of workpiece holders, the workpiece holders of one row being adapted to hold finished workpieces and the workpiece holders of the other row holding blanks, a transfer member, means for moving the transfer member from the work support to a loading station and back, means for effecting relative movement between the magazine and the transfer member, while the transfer member is at the loading station, to bring a workpiece holder for finished wrokpieces and a workpiece holder for blanks successively into registry with the transfer member so that the transfer member may deliver a finished workpiece to the first workholder and may take a new blank from the second workholder, and means operable on relative movement between the magazine and the transfer member, while the transfer member is at the loading station, to index the magazine.

4. In combination, a work support, a transfer member, a plurality of circularly arranged workpiece holders for holding finished workpieces, a plurality of circularly arranged workpiece holders, which are concentric with the first-named workpiece holders, for holding blanks, means for moving the transfer member from the work support to a loading station and back, means for effecting relative movement between the two groups of workpiece holders and the transfer member, when the transfer member is at the loading station, to bring a workpiece holder for finished workpieces and a workpiece holder for blanks successively into registry with the transfer member so that the transfer member may unload a finished workpiece to the first workholder and may pick up a new blank from the second workholder, and means for indexing the two groups of workholders, after each unloading and picking-up operation.

5. In combination, a work support, a transfer member, a slide, a support rotatably mounted on said slide, two circular rows of spools mounted on said second support, the spools of one row being adapted to hold finished workpieces, and the spools of the other row being adapted to hold blanks, and the spools of the two rows being concentric, means for moving the transfer member from the work support to a loading station and back, means for reciprocating said slide, when the transfer member is at the loading station, to bring, on stroke of the slide in one direction, a spool for finished workpieces and a spool for blanks successively into registry with the transfer member so the transfer member may unload a finished workpiece onto the first spool and may pick up a new blank from the second spool, and means operable on the return stroke of the slide to index the second-named support.

6. In combination, a work support, a rotatable transfer member having a plurality of arms projecting radially therefrom, means on each arm for carrying a workpiece, a magazine comprising a plurality of workholders, one for receiving finished workpieces and the other for holding blanks, means for indexing the transfer member about its axis to move each arm from the work support to a loading station, means for effecting relative movement between the transfer member and the magazine at the loading station to bring the workholders successively into registry with each transfer arm, when the transfer arm is at the loading station, and means controlling the operation of the workpiece carrying means so that each said means is actuated to take a finished workpiece from the work support, when each transfer arm is in registry with the work support, is actuated to unload said finished workpiece to the workholder therefor, when the arm is in registry with such holder, is actuated to pick up a new blank from the workholder therefor when the arm is in registry with such holder, and is actuated to deliver said new blank to the work support when the arm returns into registry with the work support.

7. In a machine tool, the combination with a work support, and means for operating upon a blank carried by the work support, of a rotatable transfer member having a plurality of arms projecting radially therefrom, a pair of movable gripping jaws carried by each arm, a magazine comprising a plurality of workholders, one for receiving finished workpieces and the other for holding blanks, means for indexing the transfer member about its axis to move each arm from registry with the work support to a loading station and vice versa, means for effecting relative movement between the transfer member and the magazine at the loading station to bring the workholders successively into registry with each transfer arm, when the transfer arm is at the loading station, and means controlling the gripping jaws so that while a workpiece is being operated upon, the gripping jaws of the transfer arm which is in registry with the work support are open straddling the workpiece and when the operations upon the workpiece are completed the gripping jaws are closed to grip the workpiece, and so that when a transfer arm is brought into registry at the loading station with the workholder for finished workpieces, the gripping jaws are opened to release the finished workpiece carried from the work support and when the transfer arm is brought into registry with the workholder for blanks its gripping jaws are closed again to grip a blank and when the transfer arm has been returned to registry with the work support, the gripping jaws are opened again.

8. In a machine tool, the combination with a work support, and means for operating upon a blank carried by the work support, of a rotatable transfer member having two radially disposed transfer arms, a pair of movable gripping jaws carried by each transfer arm, a magazine comprising two workholders, one for receiving finished workpieces and the other for holding blanks, means for indexing the transfer member about its axis to move the arms from registry with the work support to a loading station and vice versa, means for effecting relative movement between the transfer member and the magazine at the loading station to bring the workholders successively into registry with the transfer arm which is at the loading station, and means for opening the gripping jaws of both transfer arms and for closing the gripping jaws of either transfer arm while the gripping jaws of the other transfer arm are open.

9. In a machine tool, the combination with a work support, and means for operating upon a blank carried by the work support, of a rotatable transfer member having more than two radially disposed transfer arms, a pair of movable gripping jaws carried by each transfer arm, a magazine comprising two workholders, one for receiving finished workpieces and the other for holding blanks, means for indexing the transfer member step-by-step about its axis to move the arms from registry with the work support to a loading station and vice versa, means for controlling the gripping jaws of the several transfer arms to open the gripping jaws of the two transfer arms which are in registry with the work support and at the loading station while the other gripping jaws are closed, and to close the gripping jaws of the transfer arm which is at the loading station while the gripping jaws of the transfer arm which is in registry with the work support are still open and to close the gripping jaws of the transfer arm which is in registry with the work support upon completion of operations on a blank, and means for shifting the magazine while a transfer arm is at the loading station to bring the two workholders successively into registry with that arm.

10. In a machine tool, the combination with a work support, and means for operating upon a blank carried by the work support, of a rotatable transfer member having more than two radially disposed transfer arms, each of which is rotatable about an axis radial of the axis of the transfer member, means on each arm for carrying a workpiece, a magazine comprising two workholders, one for receiving finished workpieces and the other for holding blanks, means for indexing the transfer member step-by-step about its axis to move the arms from registry with the work support to a loading station and vice versa, means for partially rotating each arm on its axis during said indexing movement to move the carrying means from one plane to another, means for shifting the magazine while a transfer arm is at the loading station to bring the two workholders successively into registry with that arm, and means for controlling each workpiece carrying means so that it is actuated to pick a finished workpiece off the work support and carry it to the workholder for finished workpieces and to carry a new blank from the workholder for blanks to the work support during a revolution of the transfer member.

11. In a machine tool, the combination with a work support, and means for operating upon a workpiece carried by the work support, of means for stopping the operations upon the workpiece after completion of the desired operations, means for thereupon removing the completed workpiece from and chucking a new workpiece on the work support, means for restarting the operating means after the new workpiece has been chucked, a receptacle for completed workpieces, a magazine for new workpieces, and means for transferring the completed workpiece to said receptacle and for picking up another new workpiece from the magazine while operations are proceeding upon the first new workpiece.

12. In a machine tool, the combination with a work support, and means for operating upon a workpiece carried by the work support, of a transfer member comprising a plurality of arms, means on each arm to carry a workpiece, means for indexing the transfer member step-by-step to move the several carrying means step-by-step from a loading station to registry with the work support and vice versa, a magazine for holding new workpieces, a receptacle for finished workpieces, means for stopping the operations upon a workpiece after completion of the desired operations thereon, means for thereupon actuating the carrying means on one arm to pick up the finished workpiece, means for thereupon indexing the transfer member to bring another arm into registry with the work support, means for thereupon releasing the carrying means of said other arm and for chucking the workpiece carried thereby upon the work support, means for thereupon restarting the operating means, means for moving the receptacle and the magazine successively into register with the arm which has been indexed to the loading station, and means for releasing the carrying means on said arm, when the receptacle is in register with said carrying means, to unload a finished workpiece into the receptacle, and means for actuating said carrying means, when the magazine is in register with said carrying means, to pick up a new workpiece.

13. In a machine tool, the combination with a work support, and means for operating upon a workpiece carried by the work support, of a rotary transfer member comprising more than two radially disposed arms, means on each arm for carrying a workpiece, means for indexing the transfer member step-by-step to move the carrying means on the several transfer arms step-by-step from registry with the work support to a loading station, a slide, a holder for finished workpieces and a holder for blanks mounted on said slide, means for reciprocating the slide to move the holders successively into registry with the carrying means which is at the loading station, actuating means for the indexing means, the carrying means, and the reciprocating means, said actuating means being operable to cause successively the carrying means, which is in registry with the work support, to pick up the workpiece carried by the work support, to index the transfer member to bring another workpiece to the work support and to place the workpiece on the work support, to move the slide to bring the holder for finished workpieces into registry with the carrying means which is indexed to the loading station, to release said carrying means to unload the finished workpiece which has been carried thereby into the holder therefor, to bring the holder for blanks into registry with the carrying means which is at the loading station, and to actuate said carrying means to pick up a new blank, means for stopping the operating means upon completion of operations upon a workpiece and for thereupon starting the actuating means to perform its cycle, means for restarting the operating means when a new workpiece has been placed upon the work support, and means for stopping the actuating means when it has completed its cycle.

14. In a machine tool, the combination with a work support, and means for operating upon a workpiece carried by the work support, of a rotatable transfer member, a plurality of radially disposed transfer arms on said member for rotation about axes radial of the axis of said member, work-gripping means carried by each arm, means for indexing the transfer member step-by-step to move the transfer arms from a loading station to registry with the work support and vice versa, means for partially rotating the transfer arms on their respective axes upon each indexing movement, a slide, a holder on said slide for finished workpieces and a holder on said slide for blanks, means for reciprocating the slide to bring the holders successively into register with the transfer arm which is at the loading station, means for stopping the operating means after the desired operations have been performed on a workpiece and means for thereupon actuating the gripping means on the transfer arm which is in registry with the work support, to grip the finished workpiece, indexing the transfer member to move a transfer arm to registry with the work support and a transfer arm to the loading station, releasing the gripping means on the transfer arm which is moved to registry with the work support, restarting the operating means, moving the slide to bring the first-named holder into registry with the transfer arm which has been moved to the loading station, releasing the gripping means of said arm, moving the slide to bring the second-named holder into registry with the transfer arm which has been moved to the loading station, and actuating the gripping means on said arm to grip a new blank.

15. In a machine tool, a work support, means for operating upon a workpiece carried by the work support, a holder for finished workpieces, a holder for new blanks, a rotatable transfer member having a plurality of radially disposed transfer arms, each of which is rotatable about an axis extending radially of the axis of said transfer member, means on each transfer arm for gripping a work piece, means for indexing the transfer member to move the transfer arms from registry with the work support to a loading station and back to the registry with the work support, means for partially rotating each transfer arm on each indexing movement, means for moving the work holders successively into registry with a transfer arm when the arm is at the loading station, and means for actuating each gripping means so that when its arm is in registry with the work support it grips a finished workpiece on completion of the work thereon, releases that workpiece when its arm is at the loading station in registry with the first-named holder, grips a new blank when its arm is at the loading station in registry with the second-named holder, and releases that blank when its arm is again in registry with the work support.

16. In a machine tool, the combination with a work support, and means for operating upon a workpiece carried by the support, of a chuck for chucking the work on the work support, a transfer member, a plurality of radially disposed arms on said transfer member, means on each arm for gripping a work piece, a holder for finished work pieces, a holder for new blanks, means for indexing the transfer member about its axis to move the transfer arms from registry with the work support to a loading station and back, means for stopping the operating means upon completion of the desired operations on a workpiece, means for thereupon releasing the chuck to dechuck the workpiece, actuating the gripping means on the arm which is in registry with the work support to grip said work piece, and actuating the indexing means to move the arm out of registry with the work support and bring a new arm into registry therewith, actuating the gripping means on the new arm to release the workpiece carried thereby, and then actuating the chuck to chuck the new workpiece, means for thereupon restarting the operating means to effect operations on the new workpiece, and means for thereafter moving the first holder into registry with the transfer arm which has been indexed to the loading station, releasing the gripping means on said arm, moving the second holder into registry with said arm, and actuating said gripping means.

17. In combination, a work support, a transfer member, gripping means carried by said transfer member, a rotatable holder, two circular rows of spools mounted on said holder, the spools of one row being adapted to hold finished workpieces, and the spools of the other row being adapted to hold blanks, and the spools of the two rows being concentric with the axis of said holder, a lifting member mounted to be stationary relative to said holder and to lie normally beneath the second row of spools and being forked to straddle a spool of said second row, means for moving the transfer member from registry with the work support to a loading station and back, means for moving the holder to bring a spool of the first row and then a spool of the second row into registry with the transfer member when it is at the loading station, means for actuating the lifting member, when the spool of the second row is in registry with the transfer member to lift the blanks on said spool, means for releasing the gripping means when a spool of the first row is in register with the transfer arm and for actuating the gripping means when a spool of the second row is in registry with the transfer arm and the uppermost blank on said spool has been lifted to the gripping means, and means for indexing the holder after said uppermost blank has been gripped by the gripping means.

18. In combination, a work support, a transfer member, a bracket, a slide reciprocable on the bracket, a holder rotatably mounted in said slide, two circular rows of spools mounted on said holder, the spools of one row being adapted to hold finished work pieces and the spools of the other row being adapted to hold blanks, and the spools of the two rows being concentric with the axis of the holder, means for moving the transfer member from registry with the work support to a loading station and back, a ratchet wheel fixedly secured to the holder, a pawl mounted on the bracket to engage the ratchet wheel, and means for reciprocating the slide, when the transfer member is at the loading station, to bring, on stroke of the slide in one direction, a spool for finished work-pieces and a spool for blanks successively into registry with the transfer member.

19. In combination, a work support, a work spindle journaled in the work support, chucking mechanism for securing a workpiece to the work spindle, means for operating on a workpiece carried by the work spindle, a bracket secured to the work support, a rotatable and axially movable transfer member mounted in said bracket, a plurality of transfer arms secured to the transfer member, means for indexing the transfer member about its axis to move the transfer arms from registry with the work spindle to a loading station and back, a pair of gripping jaws carried by each transfer arm, means for stopping the operating means when the desired operations on a workpiece have been completed, means for thereupon successively releasing the chucking mechanism, closing the gripping jaws of the transfer arm, which is in registry with the work spindle, to grip the finished workpiece, moving the transfer member axially in one direction to strip the finished workpiece from the work spindle, actuating the indexing means to move the transfer arm from the work spindle to the loading station and bring another transfer arm with a new workpiece into registry with the work spindle, moving the transfer member back axially to load the new workpiece on the chucking mechanism, actuating the chucking mechanism to chuck the new workpiece, opening the gripping jaws of the transfer arm now in registry with the work spindle to release the newly chucked workpiece, and restarting the operating means.

20 In combination, a work support, a work spindle journaled in the work support, chucking mechanism for securing a workpiece to the work spindle, means for operating on a workpiece carried by the work spindle, a transfer member mounted for rotary and axial movement relative to the work support, a plurality of transfer arms secured to said transfer member, means for indexing the transfer member about its axis to move the transfer arms from registry with the work spindle to a loading station and back, a bar mounted for axial reciprocation in the transfer member and having a cam head secured to it, said cam head having a plurality of axially extending cam lobes thereon but having its peripheral surface coaxial with said transfer member, one lobe being operative when a transfer arm is in registry with the work spindle and the other lobe being operative when a transfer arm is at the loading station, a pair of gripping jaws secured to each transfer arm, an actuating rod slidable axially in each arm and having means at one end to actuate the pair of jaws associated with the arms and contacting at its opposite end with said cam head, means for stopping the operating means when the desired operations on a workpiece have been completed, means for thereupon successively releasing the chucking mechanism, moving the bar axially in one direction to cause the first-named cam lobe to actuate one rod to close the gripping jaws of the transfer arm then in registry with the work spindle, moving the transfer member axially in one direction to strip the finished workpiece from the work spindle, actuating the indexing means to move the transfer arm from the work spindle to the loading station, and bring another transfer arm with a new workpiece into registry with the work spindle, moving the transfer member back axially to load the new workpiece on the chucking mechanism, actuating the chucking mechanism to chuck the new workpiece, and moving the bar axially in the direction opposite to its previous movement so that the cam lobes operate to open the gripping jaws of the transfer arms at both the loading station and at the work spindle, means for supplying a new blank to the gripping jaws at the loading station after they have been opened to release a finished workpiece, and means for thereafter moving the bar back axially a distance in the first-named direction of its movement sufficient to cause the first-named cam lobe to keep the gripping jaws on the transfer arm at the work spindle open while allowing the gripping jaws on the transfer arm at the loading station to close on the new blank.

HERMAN A. MALE.

REFERENCES CITED

The following references are of record in the file of this patent:

UNITED STATES PATENTS

| Number | Name | Date |
|---|---|---|
| 681,491 | Bement | Aug. 27, 1901 |
| 1,786,689 | White | Dec. 30, 1930 |
| 1,794,424 | Smith et al. | Mar. 3, 1931 |
| 1,921,989 | Green | Aug. 8, 1933 |
| 2,080,157 | Yager et al. | May 11, 1937 |
| 2,320,039 | Jobert | May 25, 1943 |
| 2,372,287 | Oakes | Mar. 27, 1945 |
| 2,390,533 | Hill | Dec. 11, 1945 |
| 2,536,413 | Bauer et al. | Jan. 2, 1951 |